UNITED STATES PATENT OFFICE 2,346,612

ALLYL ETHER OF DIALLYL MALATE

Henry S. Rothrock, Wilmington, Del., assignor to
E. I. du Pont de Nemours & Company, Wilmington, Del., a corporation of Delaware No Drawing. Application October 14, 1940,
Serial No. 361,152

15 Claims. (Cl. 260—78)

This invention relates to new compositions of matter and more particularly to the preparation of new esters and of their polymerization products.

This application is a continuation-in-part of Patents 2,221,662 and 2,221,663.

Although unsaturated alcohol esters of unsaturated dibasic acids are known, the ether-esters derived from them by addition of a molecule of an unsaturated alcohol to the double bond of the acid constitute a new class of compounds having valuable properties.

This invention has as an object the preparation of a new class of unsaturated ether-esters. A further object resides in new products obtained by the polymerization of these esters. A further object is the preparation of new coating compositions. A still further object is a convenient and economical method for making unsaturated alcohol unsaturated ether-esters of alpha,beta-dicarboxylic acids. Other objects will appear hereinafter.

This invention comprises esters of unsaturated alcohols with unsaturated ethers of alpha,beta-dicarboxylic acids in which the ether group is removed by not more than two carbon atoms from one carbonyl of the carboxyl groups.

I have found that the ether-esters can be obtained by the reaction under alkaline conditions of substantial excess of an unsaturated alcohol, preferably at least three mols, with a saturated lower alcohol ester of an unsaturated alpha,beta-dicarboxylic acid. This last mentioned ester is one with an alcohol, preferably methyl or ethyl, which is more volatile than the unsaturated alcohol.

In the case of maleic acid and unsaturated acids of similar structure, the present ether-esters are unsaturated monohydric alcohol esters of unsaturated ethers of malic acid, e. g.

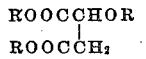

where R equals alkenyl or alkynyl and may be the same or different. The esters obtained in accordance with the practice of this invention, however, are not obtained by reaction of this acid with the unsaturated alcohol, but by reaction under the conditions pointed out above of at least three mols of the unsaturated alcohol with one mol of a suitable ester of the unsaturated acid. In the reaction of allyl alcohol with dimethyl maleate the resulting ether-ester is of the formula

In the reaction which takes place at relatively low temperatures, the unsaturated alcohol apparently displaces the methyl or ethyl alcohol from the unsaturated dicarboxylic acid ester and under the influence of an alkaline catalyst adds to the double bond of the unsaturated ester, the lower boiling saturated alcohol being distilled from the reaction mixture as formed. The reaction is preferably carried out in inert solvents, such as benzene or toluene, the solvent serving to remove the alcohol of reaction by distillation as a binary mixture. The reaction usually requires 6 to 10 hours for completion depending on the quantity of catalyst and the reactivity of the particular compound used. The reaction time can be shortened by employing higher temperatures of reaction, for example, by using less solvent or higher boiling solvents. Larger amounts of catalyst aid in shortening the reaction time. The reaction mixture can ordinarily be heated so as to bring about distillation of the lower boiling alcohol of reaction (usually methanol or ethanol) at about the rate at which it is given off in interchange reaction. The quantity of this alcohol eliminated can be determined readily by washing it from the benzene distillate with water and measuring the change in volume. The reaction products can be washed with water and then distilled, or purified by other suitable means.

I have further found that the ether-esters described herein are capable of being polymerized to useful products which are particularly valuable in the coating art.

Under mild conditions, the thin, mobile, monomeric ether-esters, preferably in mixtures with a small amount of the corresponding unsaturated esters can be polymerized or thickened to yield viscous syrups, or under more drastic polymerizing conditions can be set up to insoluble gels and then finally converted to hard, solid resins. Viscous, soluble polymers possess the very desirable property of polymerizing or drying in thin layers to yield hard, flexible, light-colored films. There is some advantage in carrying out this last step in the presence of catalytic proportions of metallic driers, for example, such as cobalt and manganese linoleate. Although the syrups will dry in the air under suitable conditions the rate of such drying is generally slow and it is desirable to use the products in baking compositions.

The following examples, in which the parts are by weight, are illustrative of the methods used in practicing my invention.

Example I

A mixture of 144 parts (1 mol) of dimethyl maleate and 288 parts (4 mols) of methallyl alcohol are heated in a reaction vessel equipped with a 4 ft. packed column, a distillation head and a water separator. The liquid is refluxed to dry the reactants and the water is separated until the vapor temperature reaches 110° C. Thorough drying is important since even small amounts of moisture tend to retard the reaction by destroying the catalyst. Twenty-five hundredth part of magnesium metal which has previously been activated by rubbing with mercury until amalgamated on the surface is then added. The reaction mass is then refluxed and methyl alcohol is withdrawn from the top of the column by maintaining the reflux temperature at 64-66° C. This yields 81 cc. (64 parts) which is substantially the theoretical amount for complete ester interchange. To remove the unreacted methallyl alcohol the residue is vacuum distilled at 35 mm. pressure until the liquid temperature reaches 145° C. Eighty-eight parts of alcohol is recovered. The residue is then distilled at 4 to 5 mm. pressure yielding 249 parts of crude methallyl ether of dimethallyl malate with a boiling range of 140-160° C. (84% yield). The product, when refractionated boils at 150-155° at 3 mm. The product gives an acetyl number of 386.6 calculated 378.5. At 25° it has a specific gravity of 1.0170 and a refractive index of 1.4600.

Example II

A mixture of 144 parts (1 mol) of dimethyl maleate and 290 parts (5 mols) of allyl alcohol with an additional 76 parts of allyl alcohol are dried by distillation as in Example I, the water being removed as an allyl alcohol-water binary boiling at 87° C. In drying 76 parts are removed. Six parts of a methyl alcohol solution of magnesium methylate containing 2.5% magnesium by weight is then added. The reaction mixture is refluxed and the methyl alcohol formed is removed by distillation at 64-66° C. until about 64 parts of methyl alcohol are obtained.

The reaction mixture is then transferred to a distillation apparatus and is distilled at 35 mm. pressure to remove the excess allyl alcohol. The pressure is then reduced to 4 mm. and the crude allyl ether of diallyl malate is distilled. The yield obtained is 229 parts boiling at 124-136° at 4 mm. (90%). The refractionated allyl ether of diallyl malate possesses the following constants: Specific gravity, 25° C.—1.0524; refractive index, 25° C.—1.4579.

Example III

A mixture of 172 g. (1 mol) of diethyl maleate, 216 g. (3 mols) of methallyl alcohol and 250 g. of dry benzene is heated at reflux under an efficient column equipped with a variable take-off. A small amount of para-phenylenediamine in absolute alcohol is added to the solution to serve as a polymerization inhibitor. To the boiling solution is added slowly a 5% sodium ethylate catalyst solution adjusting the rate of addition so as to maintain interchange reaction at a uniform rate. Methanol liberated by the reaction is eliminated by distillation. The temperature of the binary mixture at the top of the column is maintained at 68° C. by suitably adjusting the rate of distillation. Fresh benzene is added to the reaction mixture from time to time to replace that which is distilled off. The reaction requires 6½ hours for completion during which time 42 cc. of catalyst solution are added. This catalyst solution is prepared by dissolving metallic sodium in absolute ethanol. The end of the reaction is indicated by the rise of the boiling temperature to 78-80° C. even when the system is operating at total reflux. The reaction product is filtered, washed with acidified water until neutral (this process serves to remove the para-phenylenediamine inhibitor), is then dried with calcium chloride to remove most of the water. Benzene and excess methallyl alcohol are distilled off under a reflux column. On distillation of the residue under reduced pressure the following fractions are obtained: Fraction 1—B. P. 143-148.5° C. at 7 mm., 68 g.; fraction 2—B. P. 148.5-157° C. at 7 mm., 37 g.; fraction 3—B. P. 157-163° C. at 7 mm., 27 g.; fraction 4—B. P. 163-165° C. at 7 mm., 70 g.; residue 19 g. All of these fractions are colorless, mobile liquids. Fraction 1 is fairly pure dimethallyl maleate; fraction 4 is the methallyl ether of dimethallyl malate having the following structure:

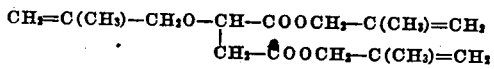

Fractions 2 and 3 are mixtures of these two compounds.

A mixture of the four fractions in the ratio in which they were originally found is treated with 1% benzoyl peroxide and heated at 90° C. In 35 minutes the mixture shows a very definite polymerization, the product being a fairly viscous soluble oil. On further heating at 90° C. the product sets to an insoluble gel and finally forms a hard solid mass. The soluble oil is cut to a 50% solution in butylacetate. Films flowed from this solution can be baked tack-free in 20 minutes at 100° C. in the presence of a cobalt drier (0.03% cobalt based on the ester). In the absence of the cobalt ½ hour is required to obtain the tack-free state. The films are very hard and adhere to glass, steel and other surfaces. They can be plasticized satisfactorily by adding a suitable material, for example, a bodied methallyl sebacate prior to application. Results similar to the above are obtained using individual ester fractions though in certain cases, particularly with fraction 1, extreme care is required to avoid gelation.

Example IV

A mixture of 144 g. (1 mol) of dimethyl fumarate, 216 g. (3 mols) methallyl alcohol, and 300 g. of benzene are heated together under the conditions described in Example III using, however, sodium methylate catalyst in place of sodium ethylate and omitting the para-phenylenediamine inhibitor. The binary mixture of methanol and benzene distills at 58-59° C. Six and one-half hours is required to complete the reaction. On working up as described in Example III the following fractions are obtained: Fraction 1—B. P. 135-144° C. at 6-7 mm., 30 g.; fraction 2—B. P. 144-157° C. at 6-7 mm., 110 g.; fraction 3—B. P. 157-167° C. at 6-7 mm., 85 g. residue 13 g. The total yield was 238 g. Fraction 3 consists almost entirely of the methallyl ether of dimethallyl malate. Fraction 2 which was a mixture of dimethallyl fumarate and the ether-ester polymerizes at 100° C. to give a thick viscous syrup soluble in butyl acetate-butyl alcohol mixture. Flow outs from this solution bake tack-free in one hour at 100° C. and in 2 hours give a hard adherent film which can not be scratched with the fingernail. A mixture of fractions 1 and 3 in the ratio of 3 to 6.5 is treated with .5% benzoyl peroxide. On heating at 100° C. for 15 minutes a clear soluble viscous syrup is obtained. Flow outs from a 50% solution of this syrup in butyl acetate set up to a hard film on baking 1½ hours at 100° C. This film has very excellent hardness and good flexibility.

*Example V*

Example V illustrates a good method for polymerizing the ether esters. A mixture of 3200 parts methallyl ether of dimethallyl maleate containing 10% dimethallyl maleate is placed in a reaction vessel fitted with a good stirrer and air-blowing tube and a thermometer. This is heated to 150° C. and is blown with a small stream of air until a sample has a viscosity of X-2 (Gardner-Holdt standard), this requiring about 6 hours. The resin is thinned with 570 parts of high solvency petroleum naphtha and is stabilized with 0.3 part of hydroquinone to prevent further bodying on standing. Clear films of this resin bake hard in one hour at 280–300° F. The resin constants of the solution obtained are: Solids 66.2%; viscosity Q on the Gardner-Holdt standard; and the color is 2 on the Gardner-Holdt standard.

*Example VI*

The mixture of 664 parts of resin solution of Example V, 1800 parts of titanium dioxide pigment and 435 parts of xylene is ground in a ball mill until the pigment is sufficiently dispersed. This mill base is then diluted with the same resin solution in the following ratio. Mill base 724.5 parts, resin solution 590 parts.

The resulting enamel contains 72.5% solids and is satisfactory for spraying purposes. It bakes to a hard tough film in one hour at 300° F.

Instead of preparing the ether-esters as in the examples by a one step reaction involving both the ester interchange and addition of the alcohol to the double bond, these reactions can be carried out in separate stages by preparing the ester of the unsaturated alcohol with the unsaturated acid, isolating, and then adding the unsaturated alcohol under the influence of an alkaline catalyst. This variation of the process permits the use of different alcohols for esterification and addition to the double bond, e. g. methallyl alcohol can be added to the double bond of allyl maleate. Thus an ether-ester having three different alcohol groups can be prepared:

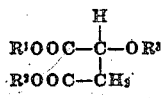

where R¹, R², and R³ are three different unsaturated alkyl radicals.

There is the possibility that the lower alcohol liberated in the interchange reaction may add to the unsaturated double bond of the ester but conditions are preferably used which remove the lower alcohol from the reaction mixture as it is set free thus making this side reaction practically negligible. In some cases there is produced a large amount of the unsaturated ester but by proper choice of conditions this reaction can be kept at a minimum.

The unsaturated alcohols used to form the compounds of this invention possess ethylenic or acetylenic unsaturation and may be entirely aliphatic in character or may contain a cyclic (aromatic, hydroaromatic, or heterocyclic) group.

As shown by the illustrative alcohols disclosed herein, the multiple bond connects carbon atoms at least once removed from the carbon bearing the hydroxyl group. The carbinol group may be primary, secondary, or tertiary. The preferred compounds are, however, alcohols which are entirely aliphatic in nature, preferably primary or secondary alcohols. Representative suitable alcohols are listed below.

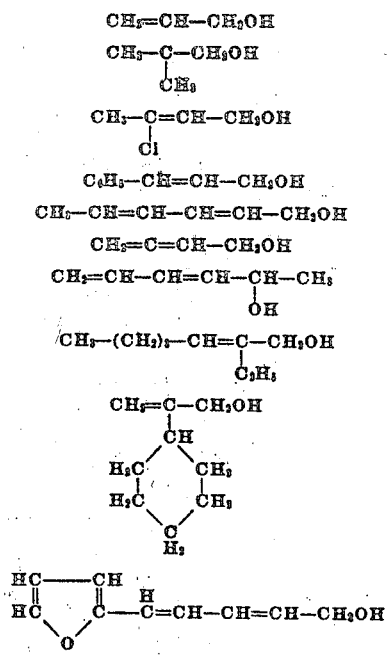

China-wood oil alcohol (prepared by sodium reduction of methyl ester of acid derived from China-wood oil)

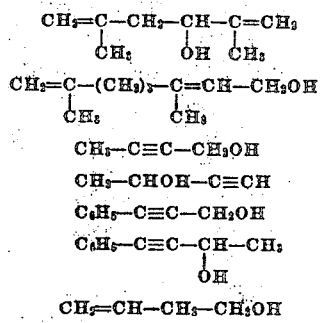

and the like along with their homologs, analogs, and suitable substitution products.

The unsaturated dicarboxylic acids (in the form of their methyl or ethyl esters) employed to form the compounds of this invention may be either aliphatic or hydroaromatic and may also contain an aromatic group. They may be defined as alpha,beta-dicarboxylic acids which contain one unsaturated ethylenic linkage in a position conjointly conjugate to the double bond of a carbonyl group of the acids. Examples of the acids of the type used in forming the compounds of this invention are maleic acid, fumaric acid, alpha,-alpha' dimethyl maleic acid, alpha methyl maleic acid, alpha,alpha' diethyl fumaric acid, fumaric acid, phenyl maleic acid, itaconic acid, tetrahydrophthalic acid, 1,4-dihydronaphthalene-2,3-dicarboxylic acid, and the like.

In addition to the products of the examples, the following representative compounds formed from the above mentioned alcohols and acids are products of this invention.

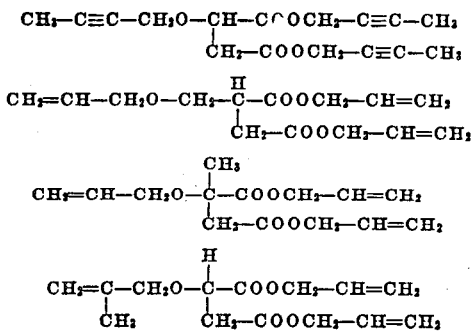

Most of the esters formed from the above acids and the above unsaturated alcohols have the formula

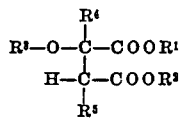

where $R^1$, $R^2$ and $R^3$ are unsaturated radicals having ethylenic or acetylenic unsaturation and are the same or different, $R^4$ and $R^5$ are hydrogen or lower alkyl and may be joined to form conjointly cycloalkyl.

As explained above the acids are used in the form of their esters with lower alcohols, especially ethanol and methanol, although other lower alcohols may be used where the boiling point relationships with the unsaturated alcohol employed in this reaction are satisfactory to permit easy elimination of the lower alcohol set free in the reaction. In practice, however, it is satisfactory and more suitable, as well as generally cheaper to use the ethyl and methyl esters. Particularly when benzene is used as the solvent or carrier these two alcohols are especially desirable, since they form binary mixtures of a much lower boiling point than the alcohol itself and thus can readily be removed from the reaction mixture.

In addition to the sodium ethylate and sodium methylate solutions described in Examples III and IV other alkaline alkoxide solutions may be employed such as magnesium alkoxide as in Example II. One advantage of alkaline alkoxides prepared from the lower alcohols is that excess alcohol used in preparing catalyst solution is readily removed from the reaction mixture in the same fashion as is the alcohol formed in the interchange. Catalysts may also be prepared by dissolving an alkali metal in the unsaturated alcohol used in the reaction. It is also possible to use concentrated solutions of alkali hydroxide in low alcohols in place of alkali metal alkoxides. Furthermore, alkali hydroxide in solid form may be used, although when this is done, it is sometimes difficult to obtain satisfactory solution of the hydroxide in the reaction. Alkali metal in the solid form may also be added to the mixture to serve as catalyst. Litharge or calcium oxide may also be used as a catalyst for this reaction though they are generally less satisfactory. In some cases, alkali carbonate is satisfactory. Magnesium alcoholates are among the best catalysts for producing the ether-esters.

Benzene is satisfactory as a solvent for the reaction since by its use low reaction temperature (when this is desirable) can be maintained and it further serves as a medium for removing alcohol of reaction through distillation of the binary mixture. Toluene may be employed in equivalent manner although generally the reaction temperature in the vessel will be somewhat higher when this solvent is employed. Any inert material such as ethylene dichloride or carbon tetrachloride, which is relatively low boiling and which is a solvent of the various components of the reaction may be used satisfactorily. The amount of solvent used in the reaction may be varied from very small amounts to quite large amounts. In general the use of smaller amounts of solvent favors more rapid reaction. The use of inert solvent may be entirely eliminated if desired.

It is desirable to use a considerable excess of the unsaturated alcohol in order to keep to a minimum the proportion of unsaturated ester formed with the desired ether-ester. The use of the excess alcohol is not disadvantageous since it is possible to recover the unreacted part in the final product.

An unusual property of these ether-esters is the fact that although they can be polymerized to an insoluble gelled infusible state, the polymerization may be stopped at an intermediate and insoluble form which is capable of being converted further into the highly polymerized form. The reaction may be conveniently stopped at an intermediate point by merely cooling to a lower temperature. Soluble forms are more or less viscous and resemble the bodied natural drying oils. On further heating, polymerization to solid products occurs. As catalysts, oxygen and oxygen yielding catalysts, for example, benzoyl peroxide, are particularly suitable for use in promoting polymerization. Although it is possible to operate in the absence of a catalyst the polymerizations are generally sluggish at low temperatures and require heating in the neighborhood of 50 to 100° C. to produce resinification at a reasonable rate. Polymerization at a much higher temperature, for example 150 to 250° C., is quite feasible and in some cases may be desirable. The rate of polymerization depends upon the composition of the ether-ester used. Of especial interest from the point of view of the coating composition industry is the fact that thin layers prepared from bodied ether-esters or from solutions thereof set up on baking to dry films. Metallic driers such as cobalt or manganese linoleate accelerate the hardening of these films, this action apparently being analogous to their function in promoting the drying of natural oils. Baking at elevated temperatures preferably at 60 to 75° C. is to be preferred but good results are also at much higher temperatures, for example, 125 to 150° C. These products may be used alone as a varnish or may be admixed with pigments, plasticizers, etc.

The unsaturated ether-esters of this invention represent a new class of materials which are valuable in the unpolymerized form as solvents and plasticizers. Because of their very high boiling point and low volatility as well as because of their chemical make-up these esters are desirable for use as plasticizers in various types of plastic and coating composition, and particularly in compositions containing cellulose acetate, cellulose nitrate, ethyl cellulose and other cellulose esters and/or ethers. These unsaturated ether-esters, generally in mixtures with the unsaturated esters, particularly in the partially polymerized or bodied form described in the examples are useful as the film-forming material in various types of coating compositions. Both with and without added cobalt or other driers they can be set up to yield hard, light-colored, tough and flexible films having good resistance to water. By controlling the bodying action, it is possible to obtain products which are of the right consistency and viscosity for application at 100% solids or at only slight dilution with organic solvents. This is a definite advantage since it is recognized to be highly desirable to employ a varnish vehicle of this type at as high solids content as it possible. Satisfactory enamels may be prepared by incorporating pigments with the unsaturated ether-esters particularly in bodied form. In preference to using the pure unsaturated ether-ester itself it may be desirable to body mixtures of two or more unsaturated ether-esters or one of the unsaturated ether-esters and one of the unsaturated esters. These unsaturated ether-esters are also suitable for use in interpolymerizing with other polymerizable compounds such as vinyl esters, acrylic and methacrylic esters, butadiene, styrene, and so forth to form products useful in either coating or molding applications.

As many apparently widely different embodiments of this invention may be made without departing from the spirit and scope thereof, it is to be understood that I do not limit myself to the specific embodiments thereof except as defined in the appended claims.

I claim:

1. An unsaturated acyclic aliphatic alcohol ester of an unsaturated ether of an aliphatic alpha,beta-dicarboxylic acid having the carboxylic groups attached to saturated carbons and having on the acid a single acyclic unsaturated aliphatic ether group removed by not more than 2 carbon atoms from a carboxyl group, said acid being essentially completely esterified with the unsaturated alcohol, said unsaturated alcohol having the multiple bond connecting carbon atoms at least once removed from the carbon bearing the hydroxyl group.

2. A polymerized unsaturated acyclic aliphatic alcohol ester of an unsaturated ether of an aliphatic alpha,beta-dicarboxylic acid having the carboxylic groups attached to saturated carbons and having on the acid a single acyclic unsaturated aliphatic ether group removed by not more than 2 carbon atoms from a carboxyl group, said acid being essentially completely esterified with the unsaturated alcohol, said unsaturated alcohol having the multiple bond connecting carbon atoms at least once removed from the carbon bearing the hydroxyl group.

3. An unsaturated monohydric acyclic aliphatic alcohol ester of an unsaturated acyclic aliphatic ether of malic acid, said acid being essentially completely esterified with the unsaturated alcohol, said unsaturated alcohol having the multiple bond connecting carbon atoms at least once removed from the carbon bearing the hydroxyl group.

4. A polymerized unsaturated monohydric acyclic aliphatic alcohol ester of an unsaturated acyclic aliphatic ether of malic acid, said acid being essentially completely esterified with the unsaturated alcohol, said unsaturated alcohol having the multiple bond connecting carbon atoms at least once removed from the carbon bearing the hydroxyl group.

5. An ethylenically unsaturated monohydric acyclic aliphatic alcohol ester of an ethylenically unsaturated acyclic aliphatic ether of malic acid, said acid being essentially completely esterified with the unsaturated alcohol, said unsaturated alcohol having the multiple bond connecting carbon atoms at least once removed from the carbon bearing the hydroxyl group.

6. A polymerized ethylenically unsaturated monohydric acyclic aliphatic alcohol ester of an ethylenically unsaturated acyclic aliphatic ether of malic acid, said acid being essentially completely esterified with the unsaturated alcohol, said unsaturated alcohol having the multiple bond connecting carbon atoms at least once removed from the carbon bearing the hydroxyl group.

7. The methallyl ether of dimethallyl malate.

8. The polymerized methallyl ether of dimethallyl malate.

9. The allyl ether of diallyl malate.

10. The polymerized allyl ether of diallyl malate.

11. A coating composition comprising the polymerized ester set forth in claim 2.

12. A process for making ether-esters which comprises heating in the presence of a catalyst selected from the group consisting of alkali alkoxides and alkaline earth alkoxides at least 3 mols of an ethylenically unsaturated acyclic aliphatic monohydric alcohol and one mol of a diester of an ethylenically unsaturated aliphatic alpha,beta-dicarboxylic acid having a double bond in a position conjugate with an acid carbonyl, the alcohol from which said diester is formed being more volatile than said unsaturated alcohol.

13. A process for making ether-esters which comprises heating in the presence of an inert solvent and in the presence of a catalyst selected from the group consisting of alkali alkoxides and alkaline earth alkoxides at least 3 mols of an ethylenically unsaturated acyclic aliphatic monohydric alcohol and 1 mol of the diester of an ethylenically unsaturated aliphatic alpha,beta-dicarboxylic acid having the double bond in a position conjugated with an acid carbonyl, the alcohol from which said diester is formed being more volatile than said unsaturated alcohol.

14. The process set forth in claim 12 in which the diester of said unsaturated dicarboxylic acid is the dimethyl ester.

15. The process set forth in claim 12 in which the diester of said unsaturated dicarboxylic acid is the diethyl ester.

HENRY S. ROTHROCK.